W. H. TRISSLER.
Improvement in Fruit-Baskets.

No. 128,927.  Patented July 9, 1872.

2 Sheets--Sheet 1.

Witnesses.
G. E. Fryett.
A. F. Cornell.

Inventor.
Wm H Trissler.
Per Burridge & Co.
Attys

2 Sheets--Sheet 2.

W. H. TRISSLER.
Improvement in Fruit-Baskets.

No. 128,927. Patented July 9, 1872.

Witnesses
G. E. Fryett.
A. F. Cornell.

Inventor
Wm. H. Trissler.
Per Burridge & Co.
Attys

UNITED STATES PATENT OFFICE.

WILLIAM H. TRISSLER, OF DUNKIRK, NEW YORK.

IMPROVEMENT IN FRUIT-BASKETS.

Specification forming part of Letters Patent No. 128,927, dated July 9, 1872.

SPECIFICATION.

*To all whom it may concern:*

Be it known that I, WILLIAM H. TRISSLER, of Dunkirk, in the county of Chautauqua and State of New York, have invented a certain new and Improved Basket for Fruit, &c.; and I do hereby declare that the following is a full, clear, and complete description thereof, reference being had to the accompanying drawing making part of the same.

Figure 1:
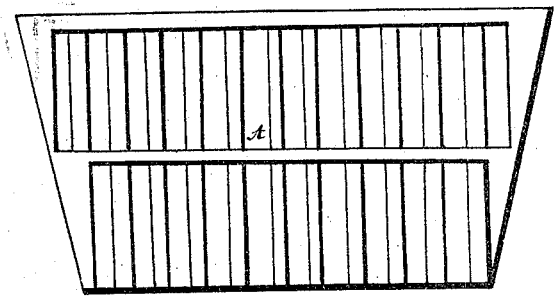
Figure 2:
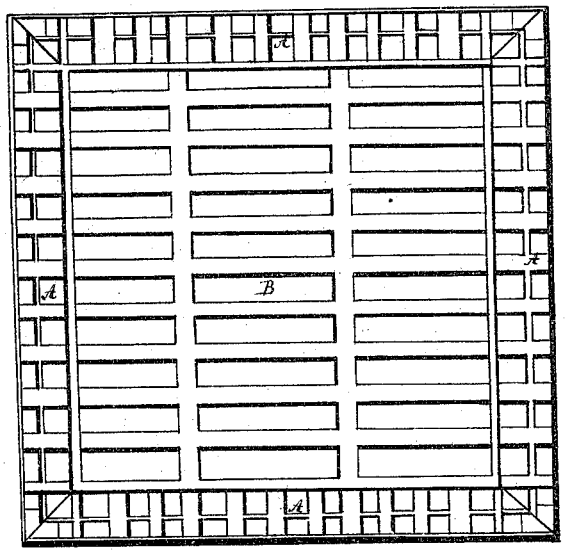
Figure 3:
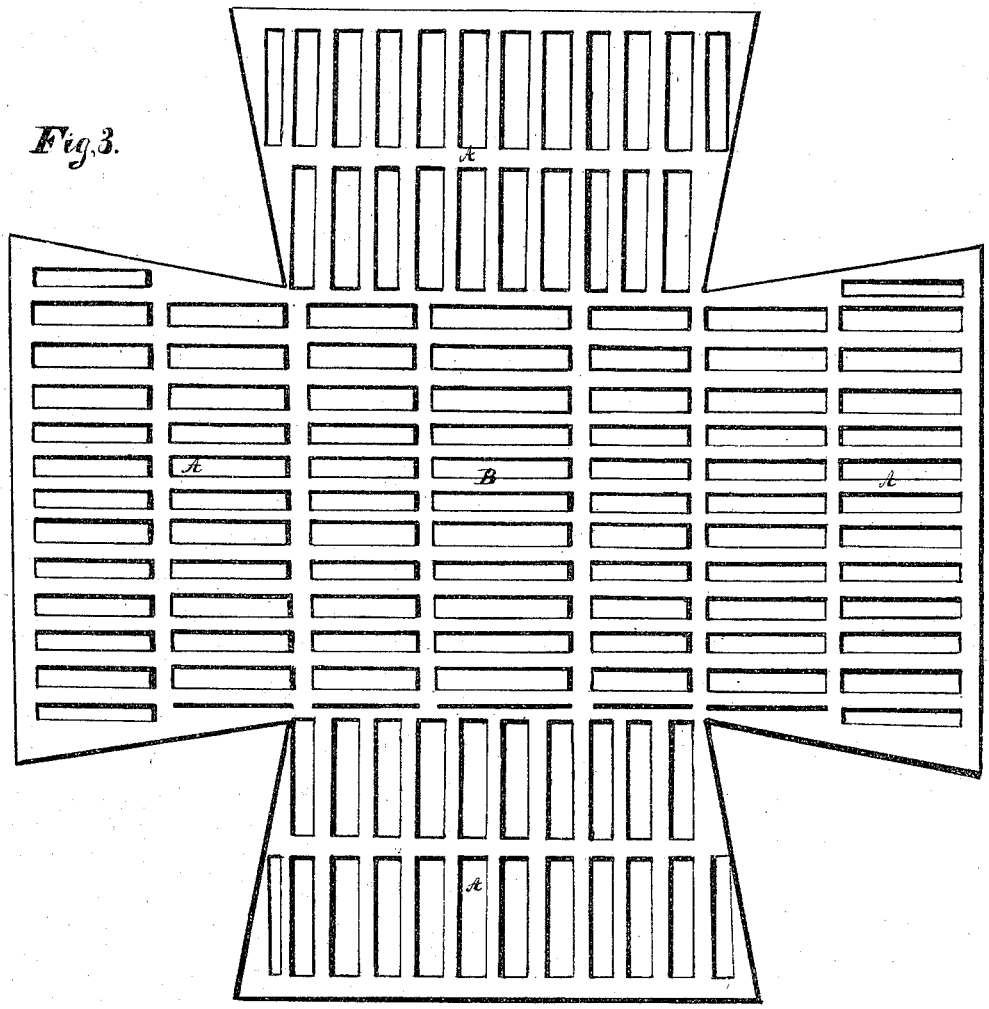

Figure 1 is a side view of the basket. Fig. 2 is a top view. Fig. 3 is a view of the basket, having its sides spread out as it comes from the mold.

Like letters of reference refer to like parts in the several views.

The nature of this invention relates to a basket for holding fruit, &c.; and the object of the same is to construct said basket of one entire piece of metal formed in a mold, substantially in the manner as follows:

I prepare a mold consisting of a flat surface of iron, stone, or of other suitable material, and therein cut the shape for the foundation or frame-work for the basket, as represented in Fig. 3, which figure represents such a foundation or frame taken from out the prepared mold referred to. Said frame consists of thin metal of a pliable character, but of sufficient strength or stiffness to be firm and of considerable elasticity, so as to resist ordinary compression and handling while in use. The peculiar design or pattern of the frame is, as will be seen, that of straight bars, but which, however, may be varied from that to any other that may be desirable, as also it may differ in size and shape. That represented in Fig. 3 is such that the sides of the basket will be flaring in respect to the bottom—that is to say, the bottom thereof will be smaller than the top, as shown in Fig. 1. The sides, however, may be made straight or at right angles to the bottom without changing the nature of the invention. The piece or frame, Fig. 3, is formed into a basket by turning up the wings A, which form the sides of the basket, and of which B is the bottom. The corners are secured by soldering, thereby completing the construction of the basket, which is light, strong, and durable, and on becoming wet—per consequence of the juice of the fruit—it will not mold or decay, as will baskets made of wood and other porous material, which absorb the moisture of the fruit, and, as a consequence, will become moldy, discolored, and unfit for use.

This basket can be cleaned when soiled by use, and thereby be made as good, bright, and clean as when new. The basket may be painted, varnished, or japanned to prevent oxidation. This article is much stronger than the common wooden and paper baskets, and therefore more durable, and cheaper as an article for shipping purposes in view of its greater durability.

*Claim.*

What I claim as my invention, and desire to secure by Letters Patent, is—

The herein-described fruit-basket, when constructed substantially in the manner as set forth, and for the purpose specified, as a new article of manufacture.

WILLIAM H. TRISSLER.

Witnesses:
 W. H. BURRIDGE,
 A. F. CORNELL.